(12) United States Patent
Kogan et al.

(10) Patent No.: US 9,858,243 B2
(45) Date of Patent: Jan. 2, 2018

(54) COMPUTING A SPECTRUM OF A SAMPLE

(75) Inventors: Hadas Kogan, Haifa (IL); Michal Aharon, Haifa (IL); Doron Shaked, Haifa (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 1118 days.

(21) Appl. No.: 14/110,706

(22) PCT Filed: Apr. 8, 2011

(86) PCT No.: PCT/US2011/031683
§ 371 (c)(1),
(2), (4) Date: Oct. 8, 2013

(87) PCT Pub. No.: WO2012/138347
PCT Pub. Date: Oct. 11, 2012

(65) Prior Publication Data
US 2014/0052424 A1   Feb. 20, 2014

(51) Int. Cl.
*G06F 17/10*   (2006.01)
*G06F 7/60*   (2006.01)
*G01J 3/46*   (2006.01)

(52) U.S. Cl.
CPC ............. *G06F 17/10* (2013.01); *G01J 3/462* (2013.01)

(58) Field of Classification Search
CPC ................................. G01J 3/462; G06F 17/10
USPC ............................................................ 703/2
See application file for complete search history.

(56) References Cited

U.S. PATENT DOCUMENTS

| | | | |
|---|---|---|---|
| 5,543,940 A * | 8/1996 | Sherman | H04N 1/6094 358/518 |
| 5,748,330 A | 5/1998 | Wang et al. | |
| 6,587,793 B2 | 7/2003 | Viassolo et al. | |
| 7,433,102 B2 | 10/2008 | Takahashi et al. | |
| 7,480,063 B2 | 1/2009 | Kakutani | |
| 2005/0052654 A1 | 3/2005 | Gila et al. | |
| 2005/0094871 A1* | 5/2005 | Berns | H04N 1/6033 382/162 |
| 2007/0263265 A1* | 11/2007 | Sekine | H04N 1/603 358/518 |
| 2008/0259400 A1* | 10/2008 | Hersch | B41M 3/144 358/2.1 |
| 2009/0213434 A1 | 8/2009 | Ito et al. | |
| 2010/0134550 A1* | 6/2010 | Ito | B41J 2/2056 347/15 |
| 2011/0199626 A1* | 8/2011 | Bestmann | H04N 1/6033 358/1.9 |

(Continued)

FOREIGN PATENT DOCUMENTS

JP   2008259168 A   10/2008
JP   2009111667 A   5/2009

OTHER PUBLICATIONS

Search report and Written opinion in counterpart PCT patent application PCT/US2011/031683, dated Jan. 18, 2012.

(Continued)

*Primary Examiner* — Andre Pierre Louis
(74) *Attorney, Agent, or Firm* — Trop, Pruner & Hu, P.C.

(57) ABSTRACT

Measurement data relating to an image of a sample acquired by a measurement device is received (202). A problem is solved that seeks a solution for a spectrum (204) of the sample, based on a non-linear model for estimating a spectral response and on a profile of the measurement device.

16 Claims, 3 Drawing Sheets

(56) References Cited

U.S. PATENT DOCUMENTS

2012/0105878 A1* 5/2012 Aharon .................. H04N 1/605
358/1.9

OTHER PUBLICATIONS

R.D. Hersch et al., "Deducing ink spreading curves . . . ," J. Imaging Sci. Technol. May-Jun. 2009.
S. Zuffi et al., "An innovative method for spectral-based printer characterization," Proc. of SPIE-IS&T Electronic Imaging, year 2002.

* cited by examiner

COMPUTING A SPECTRUM OF A SAMPLE

BACKGROUND

In some cases, it may be useful to acquire a spectrum of a sample, such as a color patch printed by a printer, or some other type of sample. A spectrum of a sample can be represented by intensities at various wavelengths. Often, use of complex and relatively expensive spectrometers, spectrophotometers, and spectroanalyzers to measure the spectrum of a sample may not be feasible due to cost and the complexity involved in manual use of such devices.

BRIEF DESCRIPTION OF THE DRAWINGS

Some embodiments are described with respect to the following figures.

DETAILED DESCRIPTION

Characterization of a spectrum relating to a sample can be used for various purposes. In some examples, the sample for which a spectrum is estimated can be one or multiple color patches (or other printed objects) that are printed by a printer, such as an inkjet printer or some other type of printer. In other implementations, a spectrum can be estimated for other types of samples, such as an image displayed on a display device, a physical object, and so forth. In the case where the sample is a color patch or other printed object printed by a printer, the estimated spectrum can be used for performing calibration of the printer. Estimating the spectrum of a sample can also assist in ensuring accurate color reproduction by an output device, such as the printer or some other output device. Alternatively, estimating a spectrum of a sample can assist in characterizing a scanner or other type of measurement device that is used to acquire an image of the sample. There can be other uses of a spectrum estimated for a target sample.

In accordance with some implementations, techniques or mechanisms are provided to allow for estimation of a spectrum of a target sample, based on measurement data related to an image of the target sample acquired by a measuring device. The spectrum is estimated by solving an optimization problem that is based on a non-linear model for estimating a spectral response, and on a profile of the measurement device.

Figure 1:
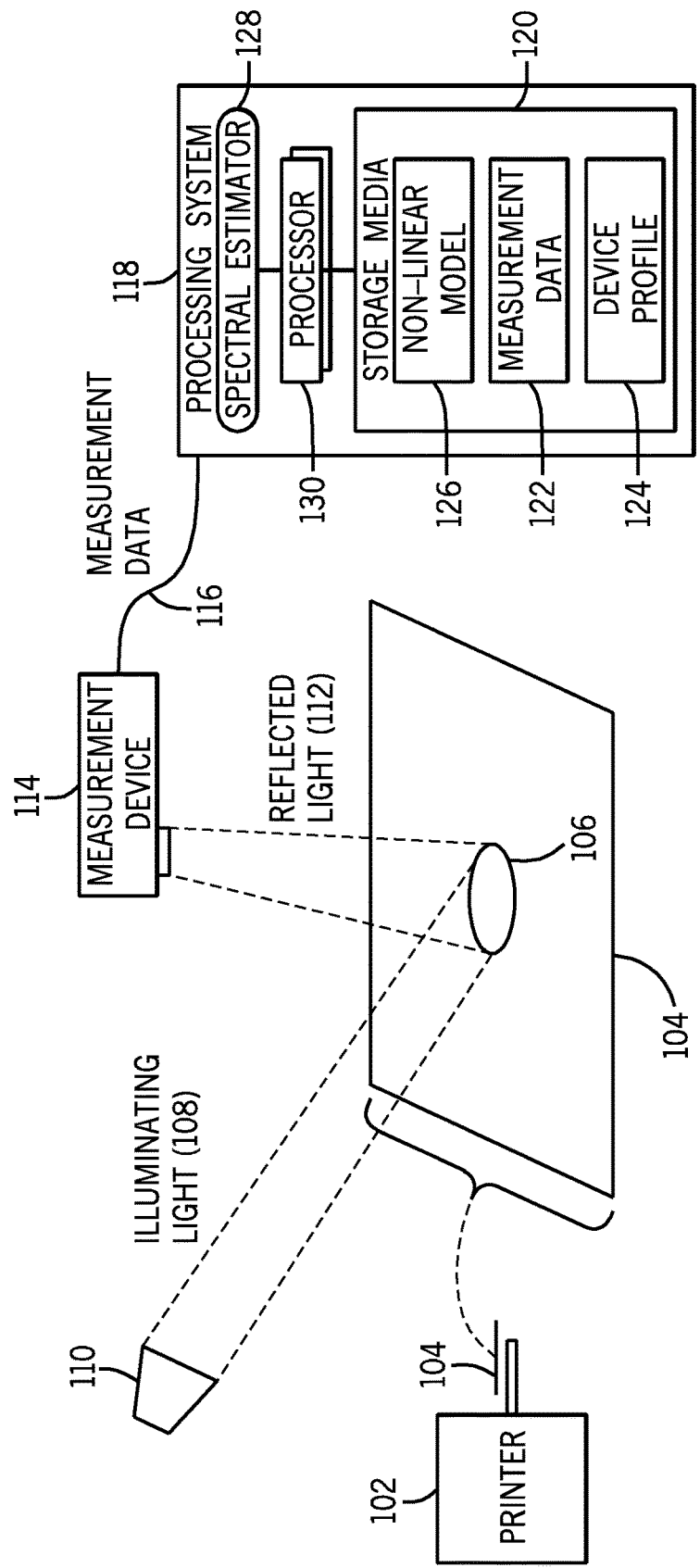
FIG. 1 is a schematic diagram of an example arrangement to acquire measurement data relating to an image of a sample, and to estimate a spectrum of the sample based on the measurement data, in accordance with some implementations.

FIG. 1 is a schematic diagram of an example arrangement that includes a printer 102 (which can be an inkjet printer or other type of printer) that is able to produce a printed page 104. The printed page 104 has a target sample 106 that is provided on a substrate (e.g. paper). In some examples, the target sample 106 is a color patch (or multiple color patches). In other examples, the target sample 106 can be any other printed object that has one or multiple colors. If multiple color patches are printed by the printer 102, then the multiple color patches can be of different colors.

In alternative implementations, instead of a target sample on a printed page, as printed by the printer 102, a target sample can be produced by another output device, such as a display device, a projector, and so forth. As yet another alternative, the target sample 106 can be a physical object.

In some examples, an illuminating light 108 produced by a light source 110 is directed onto the target sample 106. Reflected light (112) from the target sample 106 is detected by a measurement device 114. In some implementations, the measurement device 114 can be a general-purpose image scanner that optically scans the target object 106, and converts the scanned image into a digital image (where the image is associated with measurement data). Note that a general-purpose image scanner is not configured to measure targeted colors, such as by use of color filters. Rather, a general-purpose image scanner is designed to acquire a full spectrum of the colors of the target sample, without performing filtering to focus on specific colors.

In other implementations, other types of measurement devices 114 can be used to acquire measurement data relating to an image of the target sample 106.

Measurement data relating to the image of the target sample 106 acquired by the measurement device 114 is communicated over a link 116 to a processing system 118. The processing system 118 can be a computer, or any other type of system that has a processor.

The processing system 118 includes a storage media 120, which can be implemented with one or multiple disk-based storage devices and/or memory devices. The storage media 120 stores measurement data 122 received from the measurement device 114, a device profile 124 of the measurement device 114, and a non-linear model 126 (such as a model of the printer 102 and possibly a substrate of the printed page 104) that is used for estimating a spectral response. In other implementations, where the output device is other than the printer 102, the non-linear model 126 can represent the spectral response of the other type of output device.

The processing system 118 also includes a spectral estimator 128 that is executed on one or multiple processors 130 in the processing system 118. The spectral estimator 128 is able to estimate a spectrum of the target sample 106 based on the measurement data 122, device profile 124, and non-linear model 126, using techniques according to some implementations.

Figure 2:
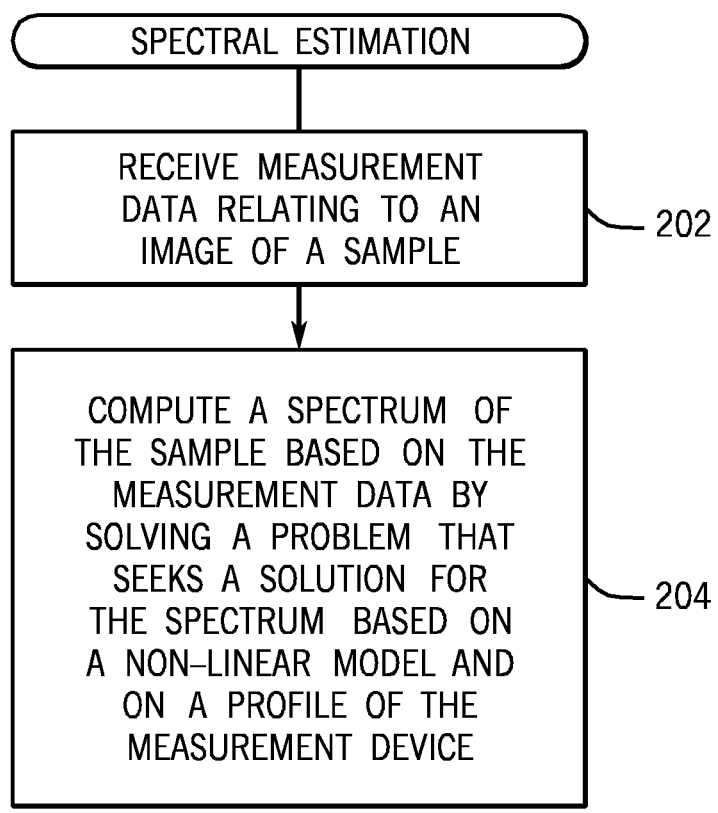
FIG. 2 is a flow diagram of a process of estimating a spectrum, in accordance with some implementations.

FIG. 2 is a flow diagram of a process performed by the spectral estimator 128, according to some implementations. The spectral estimator 128 receives (at 202) the measurement data 122 relating to an image of the target sample 106, as acquired by the measurement device 114.

The spectral estimator 128 then computes (at 204) an estimated spectrum of the sample based on the measurement data, by solving a problem that seeks to provide a solution for the spectrum that is based on the non-linear model 126 and on the device profile 124 (FIG. 1). More specifically, in some implementations, the problem is an optimization problem that seeks to minimize a function that is calculated from the non-linear model 126, the device profile 124, and the measurement data 122. Details of such an optimization problem are described further below.

The estimated spectrum computed at 204 can be represented as a K×1 vector, where K represents the number of discrete wavelengths at which the spectrum is sampled. In a specific example, K can be 36, although other values of K can be used in other examples.

Figure 3:
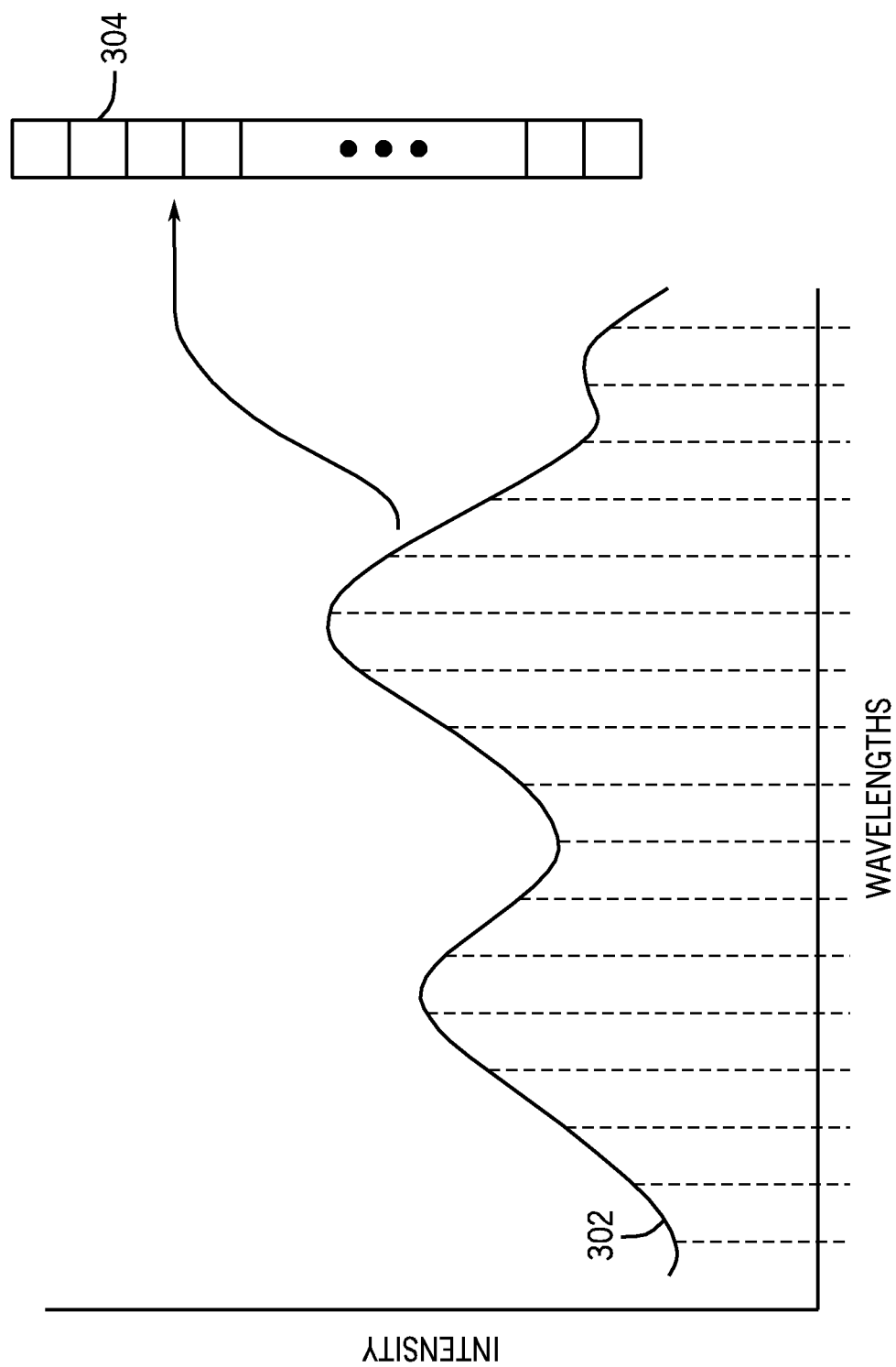
FIG. 3 is a graph of a spectrum of a sample that can be estimated using some implementations.

FIG. 3 is a graph depicting a spectrum that can be estimated using the spectral estimator 128 according to some implementations. A curve 302 represents a continuous spectrum, and vertical dashed lines in FIG. 3 represent discrete wavelengths at which respective intensities are estimated. In the example of FIG. 3, the wavelengths are represented by the horizontal axis, whereas the intensity at each wavelength is represented by the vertical axis. Assuming there are K wavelengths, the respective intensities at the K wavelengths can be entered as respective values in the respective K×1 vector 304.

A device response of the measurement device 114 (FIG. 1) can be represented as follows: $(R, G, B) = (m_1, m_2, m_3)$, where it is assumed that the device response is in the RGB (red, green, blue) color space. In other examples, the device response of the measurement device 114 can be any, arbitrary measurement device response. The values $m_1, m_2, m_3$ represent the measurement data as measured by the measurement device 114 in the RGB color space. If the measurement device 114 acquires measurement data in a color space having more than three colors, then there would be additional measurement data, $m_1, m_2, \ldots, m_z$ ($z > 3$).

The device response (of the measurement device 114) to a given spectrum s is modeled as $$m_j = \mathcal{F}_j(P_j s + \eta), j \in \{1,2,3\}, \quad \text{(Eq. 1)}$$

where $\mathcal{F}_j$ is a non-linear optoelectric conversion function, $P_j$ is a 1×K vector of the device profile (124 in FIG. 1), and $\eta$ is Gaussian noise. In the foregoing, the spectrum s, represented by a K×1 spectral vector, is computed (at 204) by the spectral estimator 128. The device profile ($P_j$) describes characteristics of the measurement device 114 at the respective K wavelengths. In some examples, there are three device profiles $P_1, P_2$, and $P_3$ for the three R, G, B colors (for j=1 to 3). Generally, there is one device profile per measurement sensor in the measurement device, where the number of measurement sensors depends on the number (z) of colors of a given color space.

If K (the length of the spectral vector, such as 304 in FIG. 3) is greater than the number of colors represented by the measurement data (three in the RGB color space or some other value of z for another color space), to solve for K unknown variables based on the three (or other z) measurements available represented by $m_1, m_2, \ldots, m_z$, additional information in the form of prior knowledge would have to be used to solve for the K variables. Such prior knowledge can be in the form of a model, which in accordance with some implementations is the non-linear model 126 (FIG. 1) for estimating a spectral response. In some implementations, the non-linear model 126 is a Yule-Nielsen model. In other implementations, other types of non-linear models can be used.

According to the Yule-Nielsen model, a general spectrum s can be described as:

$$s = \left(\sum_i a_i R_i^{1/n}\right)^n \quad \text{(Eq. 2)}$$

$$\text{s.t.} \sum_i a_i = 1, a_i > 0,$$

where $a_i$, $1 \leq i \leq 27$, are parameters representing respective ink coverages (expressed as percentages in some implementations), and where $R_i$ represent the spectral reflectances of Neugebauer primaries, where the Neugebauer primaries include all the (C, M, Y) combinations at [0, 0.5, 1.0], where [0, 0.5, 1.0] refers to optical densities of each of C (cyan), M (magenta), and Y (yellow). All the (C, M, Y) combinations at [0, 0.5, 1.0] include the following 27 ink combinations:

{ }, $\{C_{1.0}\}, \{M_{1.0}\}, \{Y_{1.0}\}, \{C_{0.5}\}, \{M_{0.5}\}, \{Y_{0.5}\},$
$\{C_{1.0}, M_{1.0}\}, \{C_{1.0}, Y_{1.0}\}, \{M_{1.0}, Y_{1.0}\},$
$\{C_{1.0}, M_{0.5}\}, \{C_{1.0}, Y_{0.5}\}, \{M_{1.0}, Y_{0.5}\}, \{C_{0.5}, M_{1.0}\},$
$\{C_{0.5}, M_{0.5}\},$
$\{C_{0.5}, Y_{0.5}\}, \{C_{0.5}, Y_{1.0}\}, \{M_{0.5}, Y_{1.0}\}, \{M_{0.5}, Y_{0.5}\}.$
$\{C_{1.0}, M_{1.0}, Y_{1.0}\}, \{C_{0.5}, M_{0.5}, Y_{0.5}\}, \{C_{0.5}, M_{1.0}, Y_{1.0}\},$
$\{C_{1.0}, M_{0.5}, Y_{0.5}\}, \{C_{0.5}, M_{0.5}, Y_{1.0}\}, \{C_{1.0}, M_{0.5}, Y_{1.0}\},$
$\{C_{0.5}, M_{1.0}, Y_{1.0}\}, \{C_{0.5}, M_{1.0}, Y_{0.5}\}.$

In other implementations, instead of using (C,M,Y) combinations at [0,0.5,1.0], (C,M,Y) combinations as [0,1.0] can be used. In Eq. 2 above, the n exponent in $R_i^{1/n}$ provides a non-linear relationship. The Yule-Nielsen model is different from the Neugebauer model, which defines a linear relationship between ink coverages and a spectral response. The Yule-Nielsen model defines a non-linear relationship. The value of n, which is greater than 1, can be empirically set based on expert knowledge and/or tests. The regular Neugebauer model employs a Demichel's dot overlap model for the surface coverage of each primary. With certain printers, such as inkjet printers, the simple Demichel model does not describe well the surface coverage of each primary ink—however, to avoid a more complicated model that accounts for ink spreading and other physical phenomena, the surface coverages ($a_i$) are assumed to be positive and their sum is 1, as specified in Eq. 2 above. In accordance with some implementations, to estimate a spectral vector, s, that represents the spectrum of the target sample 106 of FIG. 1, the following optimization problem can be solved:

$$(a, s) = \operatorname*{argmin}_{a,s}\{\|(R^{1/n}a)^n - s\|_2^2 + \lambda\|Ps - m\|_2^2\} \quad \text{(Eq. 3)}$$

$$\text{s.t.} \quad 0 < a, \sum_i a_i = 1.$$

In the optimization problem represented by Eq. 3, R is a matrix that contains $R_i$ values from Eq. 2, a is a matrix that is a vector of the $a_i$ values of Eq. 2, $\lambda$ is a predefined constant (where $\lambda$ is selected to balance between the two assumptions with respect to the estimated spectrum—that the spectrum respects the Yule-Nielsen model and that the measurements are represented by m), and $(R^{1/n}a)^n$ is based on the Yules-Nielsen model expressed in Eq. 2, which maps between a vector of ink coverages ($a_i$, i=1 to 27) and the spectral response of the target sample. Also, P is a 3×K matrix containing the three profiles of the measurement device 114 (such as the device profiles $P_1, P_2$, and $P_3$ for the three R, G, B colors mentioned above), and m is the linearized (R,G,B) measurements (linearized after applying $\mathcal{F}^{-1}$ on m, where $\mathcal{F}^{-1}$ is a matrix that is the inverse of $\{\mathcal{F}1, \mathcal{F}2, \mathcal{F}3\}$, which are the non-linear optoelectric conversion functions employed in Eq. 1 above).

Also, in the optimization problem (Eq. 3) set forth above, the $\|\ \|_2^2$ operator denotes an $l^2$—norm of the vector contained within the pair of double lines. The operator argmin stands for argument of the minimum, that is to say that the set of points of the given argument (which in this case includes the vectors a and s) for which the value of the function within the braces { } attains a minimum value.

In the optimization problem (Eq. 3), both s and a are unknown. Solving the optimization problem is performed iteratively, by assuming a and solving for s, and then using s to solve for a. Multiple iterations of solving the optimization problem are performed, where successive ones of the iterations alternately solve for the spectral vector (s) and the ink coverage parameters (a). The iterations are continued until a predefined criterion is satisfied.

More generally, the optimization problem (Eq. 3) seeks to find the spectral vector, s, representing the spectrum that minimizes a function based on a difference between the non-linear model and the spectral vector and a difference between a product of the device profile and the spectral vector and the measurement data.

A specific procedure to solve the optimization problem according to some implementations is set forth below:

Initialize $a^0$, $j=1$, $\epsilon^0=1000$. Repeat iteratively:

calculate $N_{est}^j = (R^{1/n} a^{j-1})^n$;

Solve: $s_{est}^j = \text{argmin}_s \{\|N_{est}^j - s\|_2^2 + \lambda \|Ps - m\|_2^2\}$ (a direct solution);

Solve $a_{est}^j = \text{argmin}_a \{\|R^{1/n}a - (s_{est}^j)^{1/n}\|_2^2$ s.t. $0 < a, \Sigma_i a_i = 1$ (a quadratic optimization with constraints);

Calculate $\epsilon^j = \|(R^{1/n}a)^n - s_{est}^j\|_2^2 + \lambda \|Ps_{est}^j - m\|_2^2$;

Stop if $\text{abs}(\epsilon^j - \epsilon^{j-1}) < T$, with T a predefined threshold.

In the foregoing algorithm, a is a vector containing the $a_i$ values. As indicated in the procedure, an estimated vector s in iteration j ($s_{est}^j$) is calculated, followed by solving for an estimated vector a in iteration j ($a_{est}^j$). In the next iteration (j+1), the previous vector a in iteration j is used to estimate the vector s in iteration j+1. The value $\epsilon^j$ represents an error value, that is used to calculate a difference that is compared with the threshold T (a predefined threshold). For example, if the difference between $\epsilon^j$ and $\epsilon^{j-1}$ values calculated in successive iterations (where $\epsilon^{j-1}$ is calculated in iteration j−1, and $\epsilon^j$ is calculated in iteration j) is less than T, then the iterative procedure can be stopped. Stated differently, the iterative procedure shown above is continued until a predefined criterion is satisfied, which in some implementations is based on error values in successive iterations ($\epsilon^j$ and $\epsilon^{j-1}$ values) being different by less than the threshold T.

By using techniques or mechanisms according to some implementations, an automated way of estimating a spectrum of a target sample is provided. In some examples, the spectrum estimation can be performed using a relatively low-cost measurement device, such as a general-purpose image scanner.

Machine-readable instructions of modules discussed above, including the spectral estimator 128 of FIG. 1) are loaded for execution on a processor or multiple processors (such as 130 in FIG. 1). A processor can include a microprocessor, microcontroller, processor module or subsystem, programmable integrated circuit, programmable gate array, or another control or computing device.

Data and instructions are stored in respective storage devices, which are implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
receiving, by a system having a processor, measurement data relating to an image of a sample printed by a printer, the image acquired by a measurement device having a profile describing characteristics of the measurement device at a plurality of wavelengths;
computing, by the system, a spectrum of the sample based on the measurement data, by iteratively solving an optimization problem, in which the spectrum of the sample is unknown and color coverage of the sample is unknown, to minimize a function of a difference between a nonlinear model estimating a spectral response and the spectrum, and of a difference between the spectrum and the measurement data, wherein iteratively solving the optimization problem comprises alternatively solving for a spectral vector and color coverage parameters; and
calibrating the printer using the spectrum.

2. The method of claim 1, wherein solving the optimization problem comprises solving the optimization problem to seek a solution that maps a vector of ink coverages to a spectral vector representing the spectrum.

3. The method of claim 1, wherein solving the optimization problem comprises solving the optimization problem to seek a solution based on a Yule-Nielsen model.

4. The method of claim 1, wherein receiving the measurement data comprises receiving the measurement data in a color space having a number of colors, wherein the spectrum is represented by a spectral vector having a number of variables greater than the number of colors.

5. The method of claim 4, wherein the non-linear model is defined by ink coverage parameters and spectral reflectances, and wherein solving the optimization problem further seeks a solution for the ink coverage parameters.

6. The method of claim 5, wherein solving the optimization problem comprises performing multiple iterations of solving the optimization problem, where successive ones of the iterations alternately solve for a spectral vector and the ink coverage parameters, the method further comprising:
continuing with the iterations until a predefined criterion is satisfied.

7. The method of claim 1, wherein the measurement device is an image scanning device that does not acquire the spectrum of the sample.

8. A system comprising:
a printer to print a sample;
a measurement device to acquire an image of the sample; and
a processor to:
receive measurement data relating to the image, the image an image of a sample acquired by a measurement device having a profile describing characteristics of the measurement device at a plurality of wavelengths;

determine a spectrum of the sample based on the measurement data, by iteratively solving an optimization problem, in which the spectrum of the sample is unknown and color coverage of the sample is unknown, to minimize a function of a difference between a non-linear model estimating a spectral response and the spectrum, and of a difference between the spectrum and the measurement data, wherein iteratively solving the optimization problem comprises alternatively solving for a spectral vector and color coverage parameters; and calibrate the printer using the spectrum.

9. The system of the claim 8, wherein a spectral vector has intensities at respective wavelengths, and wherein the profile has characteristics of the measurement device at the respective wavelengths.

10. The system of claim 8, wherein the non-linear model is a Yules-Nielsen model.

11. A non-transitory computer-readable data storage medium storing computer-executable code that a computing device executes to perform a method comprising:

receiving measurement data relating to an image of a sample printed by a printer, the image acquired by a measurement device having a profile describing characteristics of the measurement device at a plurality of wavelengths;

computing a spectrum of the sample based on the measurement data, by iteratively solving an optimization problem, in which the spectrum of the sample is unknown and color coverage of the sample is unknown, to minimize a function of a difference between a non-linear model estimating a spectral response and the spectrum, and of a difference between the spectrum and the measurement data, wherein iteratively solving the optimization problem comprises alternatively solving for a spectral vector and color coverage parameters; and calibrating the printer using the spectrum.

12. The non-transitory computer-readable data storage medium of claim 11, wherein solving the optimization problem comprises solving the optimization problem to seek a solution that maps a vector of ink coverages to a spectral vector representing the spectrum.

13. The non-transitory computer-readable data storage medium of claim 11, wherein solving the optimization problem comprises solving the optimization problem to seek a solution based on a Yule-Nielsen model.

14. The non-transitory computer-readable data storage medium of claim 11, wherein receiving the measurement data comprises receiving the measurement data in a color space having a number of colors, wherein the spectrum is represented by a spectral vector having a number of variables greater than the number of colors.

15. The non-transitory computer-readable data storage medium of claim 14, wherein the non-linear model is defined by ink coverage parameters and spectral reflectances, and wherein solving the optimization problem seeks a solution for the ink coverage parameters.

16. The non-transitory computer-readable data storage medium of claim 15, wherein solving the optimization problem comprises performing multiple iterations of solving the optimization problem, where successive ones of the iterations alternately solve for a spectral vector and the ink coverage parameters, the method further comprising:

continuing with the iterations until a predefined criterion is satisfied.

* * * * *

UNITED STATES PATENT AND TRADEMARK OFFICE
CERTIFICATE OF CORRECTION

PATENT NO. : 9,858,243 B2
APPLICATION NO. : 14/110706
DATED : January 2, 2018
INVENTOR(S) : Hadas Kogan et al.

It is certified that error appears in the above-identified patent and that said Letters Patent is hereby corrected as shown below:

In the Claims

In Column 6, Lines 65-66, in Claim 8, after image delete "an image of a sample acquired by a measurement device" therefor.

Signed and Sealed this
Twenty-sixth Day of June, 2018

Andrei Iancu
*Director of the United States Patent and Trademark Office*